(12) United States Patent
Keller

(10) Patent No.: US 9,138,675 B2
(45) Date of Patent: Sep. 22, 2015

(54) PROCESS FOR DEGASSING CONDENSED SULFUR FROM A CLAUS SULFUR RECOVERY SYSTEM

(71) Applicant: PHILLIPS 66 COMPANY, Houston, TX (US)

(72) Inventor: Alfred E. Keller, Katy, TX (US)

(73) Assignee: Phillips 66 Company, Houston, TX (US)

( * ) Notice: Subject to any disclaimer, the term of this patent is extended or adjusted under 35 U.S.C. 154(b) by 0 days.

(21) Appl. No.: 14/304,306

(22) Filed: Jun. 13, 2014

(65) Prior Publication Data

US 2014/0377165 A1 Dec. 25, 2014

Related U.S. Application Data (60) Provisional application No. 61/837,927, filed on Jun. 21, 2013, provisional application No. 61/837,944, filed on Jun. 21, 2013, provisional application No. 61/837,950, filed on Jun. 21, 2013, provisional application No. 61/837,958, filed on Jun. 21, 2013, provisional application No. 62/010,766, filed on Jun. 11, 2014.

(51) Int. Cl.
| | |
|---|---|
| C01B 17/02 | (2006.01) |
| C01B 17/04 | (2006.01) |
| B01D 53/00 | (2006.01) |
| B01D 5/00 | (2006.01) |
| C01B 17/05 | (2006.01) |
| F25J 1/00 | (2006.01) |

(52) U.S. Cl.
CPC ............... *B01D 53/002* (2013.01); *B01D 5/00* (2013.01); *B01D 5/0012* (2013.01); *B01D 5/0051* (2013.01); *B01D 5/0069* (2013.01); *B01D 5/0093* (2013.01); *C01B 17/0232* (2013.01); *C01B 17/0447* (2013.01); *C01B 17/05* (2013.01); *F25J 1/00* (2013.01); *F25J 1/0002* (2013.01)

(58) Field of Classification Search
CPC .. C01B 17/027; C01B 17/04; C01B 17/0404; C01B 17/02
USPC .................................. 423/574.1, 578.1, 576.2
See application file for complete search history.

(56) References Cited

U.S. PATENT DOCUMENTS

| | | | |
|---|---|---|---|
| 2,049,160 A | 7/1936 | Gleason et al. | |
| 3,607,132 A | 9/1971 | Sudduth | |
| 3,939,250 A | 2/1976 | Michel et al. | |
| 4,508,699 A | 4/1985 | Schoofs | |
| 4,729,887 A | 3/1988 | Pendergraft | |
| 4,844,720 A * | 7/1989 | Pendergraft et al. | ............ 95/235 |

(Continued)

OTHER PUBLICATIONS

Alberta Sulphur Research Ltd., Chalk Talk, "A Semi-Annual Presentation of Research Highlights", University of Research Centre, Calgary, Alberta, Canada, Jun. 24, 2009, 51 pages.

(Continued)

*Primary Examiner* — Timothy Vanoy
(74) *Attorney, Agent, or Firm* — Phillips 66 Company (57) ABSTRACT

A process of producing degassed liquid sulfur using process gas containing H2S to agitate the liquid sulfur being degassed while in contact with a degassing catalyst. Process gas is less costly and less complicated and quickly accomplishes substantial degassing rendering the liquid sulfur much safer in storage and transportation.

27 Claims, 4 Drawing Sheets

(56) References Cited

U.S. PATENT DOCUMENTS

| | | | |
|---|---|---|---|
| 4,897,251 A | | 1/1990 | Maurice et al. |
| 4,935,221 A | | 6/1990 | Bronfenbrenner et al. |
| 5,015,459 A | | 5/1991 | Pendergraft |
| 5,015,460 A | | 5/1991 | Pendergraft |
| 5,352,422 A | * | 10/1994 | van den Brink et al. ...... 423/224 |
| 5,632,967 A | * | 5/1997 | Nasato ...................... 423/578.1 |
| 2005/0201924 A1 | | 9/2005 | Ramani et al. |
| 2008/0050306 A1 | | 2/2008 | Keller et al. |

OTHER PUBLICATIONS

Alberta Sulphur Research Ltd., Chalk Talk, "A Semi-Annual Presentation of Research Highlights", The Fairmont Pallister Hotel, Calgary, Alberta, Canada, Jan. 21, 2010, 58 pages.

Alberta Sulphur Research Ltd., Chalk Talk, "A Semi-Annual Presentation of Research Highlights", University of Research Centre, Calgary, Alberta, Canada, Jun. 23, 2010, 49 pages.

P.D. Clark and D. Cicerone, "Liquid Sulphur Degassing: Fundamentals and New Technology Development in Sulphur Recovery" 20 pages.

Haldor Topsoe Catalysing Your Business, "Claus Unit Tail Gas Treatment Catalysts", 8 pages.

PCT Notification of Transmittal of the International Search Report and the Written Opinion of the International Searching Authority, or the Declaration, International Filing Date: Jun. 17, 2014; International Application No. PCT/US2014/042709; 16 pages.

PCT Notification of Transmittal of the International Search Report and the Written Opinion of the International Searching Authority, or the Declaration, International Filing Date: Jun. 17, 2014; International Application No. PCT/US2014/042717; 10 pages.

PCT Notification of Transmittal of the International Search Report and the Written Opinion of the International Searching Authority, or the Declaration, International Filing Date: Jun. 17, 2014; International Application No. PCT/US2014/042725, 13 pages.

PCT Notification of Transmittal of the International Search Report and the Written Opinion of the International Searching Authority, or the Declaration, International Filing Date: Jun. 17, 2014; International Application No. PCT/US2014/042776; 8 pages.

PCT Notification of Transmittal of the International Search Report and the Written Opinion of the International Searching Authority, or the Declaration, International Filing Date: Jun. 17, 2014; International Application No. PCT/US2014/042748; 10 pages.

\* cited by examiner

PROCESS FOR DEGASSING CONDENSED SULFUR FROM A CLAUS SULFUR RECOVERY SYSTEM

CROSS-REFERENCE TO RELATED APPLICATIONS

This application is a non-provisional application which claims benefit under 35 USC §119(e) to U.S. Provisional Application Ser. No. 61/837,927 filed Jun. 21, 2013, entitled "APPARATUS FOR IN-SITU PRODUCTION OF LOW DISSOLVED HYDROGEN SULPHIDE, DEGASSED, SULFUR FROM CLAUS SULFUR RECOVERY," and to U.S. Provisional Application Ser. No. 61/837,944 filed Jun. 21, 2013, entitled "APPARATUS FOR IN-SITU PRODUCTION OF LOW DISSOLVED HYDROGEN SULPHIDE, DEGASSED, SULFUR FROM CLAUS SULFUR RECOVERY," and to U.S. Provisional Application Ser. No. 61/837,950 filed Jun. 21, 2013, entitled "PROCESS FOR IN-SITU PRODUCTION OF LOW DISSOLVED HYDROGEN SULPHIDE, DEGASSED, SULFUR FROM CLAUS SULFUR RECOVERY," and to U.S. Provisional Application Ser. No. 61/837,958 filed Jun. 21, 2013, entitled "PROCESS FOR IN-SITU PRODUCTION OF LOW DISSOLVED HYDROGEN SULPHIDE, DEGASSED, SULFUR FROM CLAUS SULFUR RECOVERY," and to U.S. Provisional Application Ser. No. 62/010,766 filed Jun. 11, 2014, entitled "PROCESS FOR DEGASSING CONDENSED SULFUR FROM A CLAUS SULFUR RECOVERY SYSTEM", all five of which are incorporated herein by reference in their entirety.

STATEMENT REGARDING FEDERALLY SPONSORED RESEARCH OR DEVELOPMENT

None.

FIELD OF THE INVENTION

This invention relates to the recovery of degassed sulfur from a Claus sulfur recovery plant and especially to substantially reducing the $H_2S$ content of liquid sulfur for the safe storage and transportation of liquid sulfur.

BACKGROUND OF THE INVENTION

The Claus process is a gas desulfurizing process for recovering elemental sulfur from gaseous hydrogen sulfide. It was first developed in the 1880's and has become an industry standard for refineries, chemical plants and natural gas processing plants. As petroleum and natural gas is tending to contain ever increasing amounts of sulfur compounds while fuel regulations are tending to mandate less allowable sulfur in fuel, Claus processes become increasingly important.

A Claus plant, which is a multi-step process within a larger industrial plant is arranged to recover sulfur from gaseous hydrogen sulfide. Typically, elemental sulfur is produced by a thermal step and several catalytic steps. Elemental sulfur is separated from the Claus plant as a liquid at one or more condensers.

While current sulfur condensers have proven satisfactory for condensing sulfur, there is a need for improvement in the quality of the sulfur condensed. The problem is that the condensed sulfur includes dissolved $H_2S$. Over an extended time, the $H_2S$ will eventually disassociate from the liquid sulfur and accumulate as a toxic and flammable gas in vapor spaces at the top of the storage or transport vessels. Since an unsafe condition is possible until the sulfur is fully degassed of dissolved $H_2S$, precautionary steps are required prior to opening a sulfur vessel and while transferring liquid sulfur from one vessel to another.

It has been found that it is the nature of a liquid sulfur produced in a sulfur condenser process that reactant hydrogen sulfide ($H_2S$) is incorporated into the sulfur as simple dissolved $H_2S$ and also as chemically bound with sulfur in the form what is sometimes called a sulfane or polysulfane. Sulfane is $H_2S_x$, (with x>1). $H_2S_x$ will convert back to $H_2S$ and elemental sulfur in time through an equilibrium reaction which may be accelerated with a catalyst. This is a known problem and most efforts to remove $H_2S$ from the elemental sulfur include bubbling various gases such as air and preferably inert gases such as nitrogen and carbon dioxide through the liquid sulfur while in a catalyst bed. This degassing process, while necessary, takes time and adds to the expense of capturing sulfur from refineries, gas plants and chemical plants that deal with sulfur.

Thorough degassing is imperative as capturing and disposing of $H_2S$ that is emanating from liquid sulfur storage is another issue. If the elemental sulfur is not adequately degassed, $H_2S$ emanating from liquid sulfur storage may become a fugitive emission in an area that is closely monitored for environmental compliance. In some instances, up to half of the reported emissions from a Claus sulfur recovery plant and Claus Tail Gas Cleanup unit can come from $H_2S$ emanating from liquid sulfur in storage. Without degassing operations or adequate capture and disposal technology, these additional emissions may limit the sulfur processing capability of the Claus/TGU (Tail Gas Unit) unit.

Technology is needed to reduce costs and overcome and resolve these problems without creating new disadvantages.

BRIEF SUMMARY OF THE DISCLOSURE

The invention more particularly relates to a process for producing liquid sulfur that is degassed of H2S. The process includes a sulfur degassing catalyst and liquid sulfur in a vessel wherein the sulfur degassing catalyst and liquid sulfur define a contact zone and condensed products are directed to the vessel from a Claus plant into the contact zone of the vessel. These condensed products include elemental sulfur, dissolved $H_2S$ and $H_2S_x$ where x≥2. The conversion of $H_2S_x$ is catalyzed on the surface of the sulfur degassing catalyst to form $H_2S$ and elemental sulfur and process gas from the Claus plant is directed at an elevated pressure into the contact zone of the vessel to agitate the sulfur degassing catalyst and liquid sulfur. The process gas also carries $H_2S$ that has formed on the surface of the sulfur degassing catalyst away from the sulfur degassing catalyst. The process gas includes $H_2S$ prior to entering the vessel. The processes gases along with $H_2S$ from the contact zone are exhausted for further processing in the Claus plant and liquid sulfur that is degassed of $H_2S$ is extracted from the contact zone.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
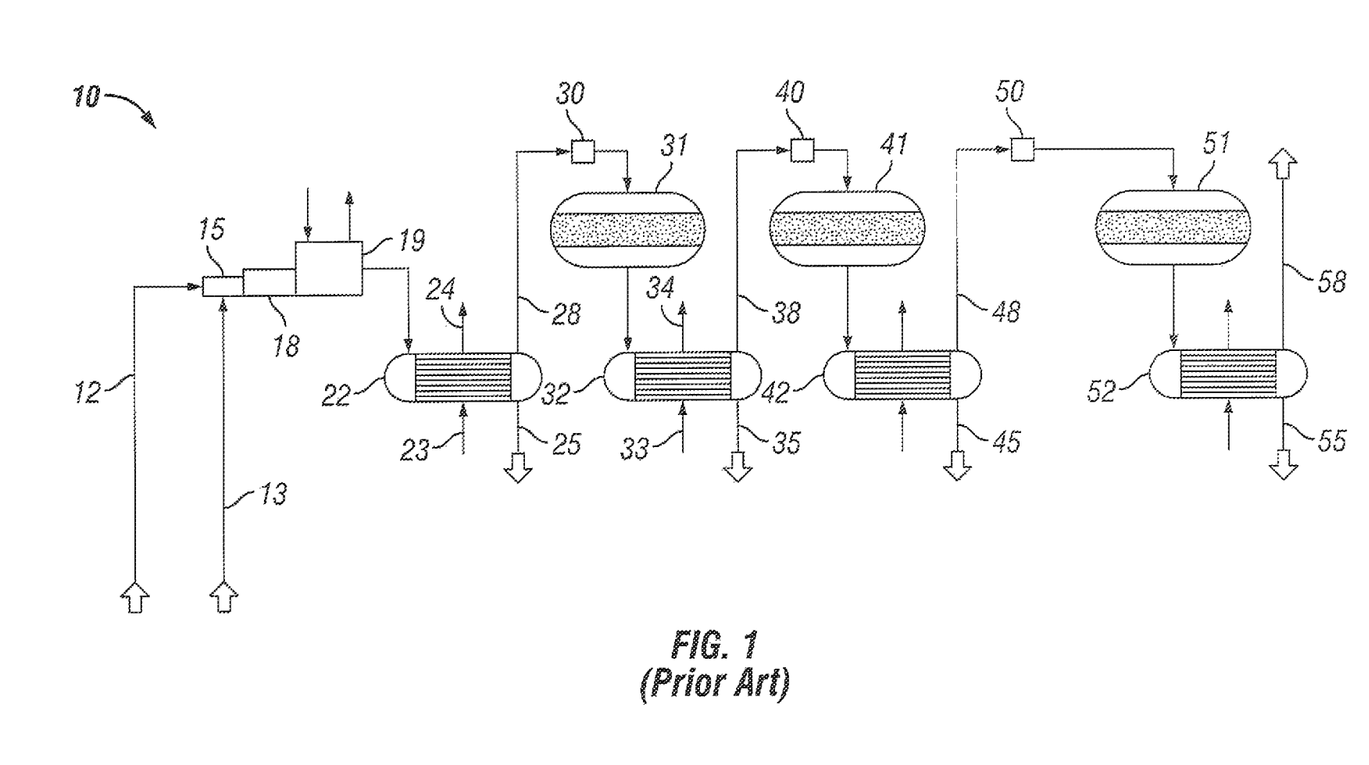
FIG. 1 is a flow diagram showing a basic and conventional Claus sulfur recovery system.

Referring now to FIG. 1, a line diagram for a conventional Claus Sulfur Recovery Plant is generally indicated by the numeral 10. Claus Plants have been in use for more than a century at petroleum refineries to remove sulfur from gases containing $H_2S$. Undertaking a brief explanation of a conventional Claus Plant, referring to Claus Sulfur Recovery Plant 10, gas having sulfur, typically in the form of $H_2S$, enters via conduit 12. A burner 15 along with reaction furnace 18 are provided to burn and oxidize at least part of the $H_2S$ to elemental sulfur $SO_2$ and water wherein the reaction is:

These very hot gases and vapors are cooled down in a waste heat boiler 19 and a first condenser 22 where the elemental sulfur is condensed and removed at liquid discharge conduit 25. Cooling water is provided to both the waste heat boiler 19 and to the condenser 22, as shown at inlet 23 to make steam, as shown at outlet 24, for use in making electricity or elsewhere in the in the Claus Sulfur Recovery Plant 10 or in the larger industrial plant that is not shown. The remaining gases from the first condenser 22 are directed through the gas conduit 28 to reheater 30 where the gases are reheated and then delivered to a catalytic conversion to elemental sulfur for converting remaining $H_2S$ and $SO_2$ to elemental sulfur. The chemical process is generally described as follows:

Again, the process gases are cooled in the second sulfur condenser 32 so that elemental sulfur may be condensed to a liquid and removed at the second liquid discharge conduit 35. The gases are conventionally directed by a conduit 38 to further sulfur recovery steps including catalytic reactor 41 and 51 to recover liquid sulfur at discharge conduits 45 and 55.

It should be noted that more thorough descriptions of a Claus system may be found in many other places and there are doubtless variations known in the art. This description has been presented simply to describe the improvement related to degassing the liquid sulfur acquired by most any Claus system.

Figure 2:
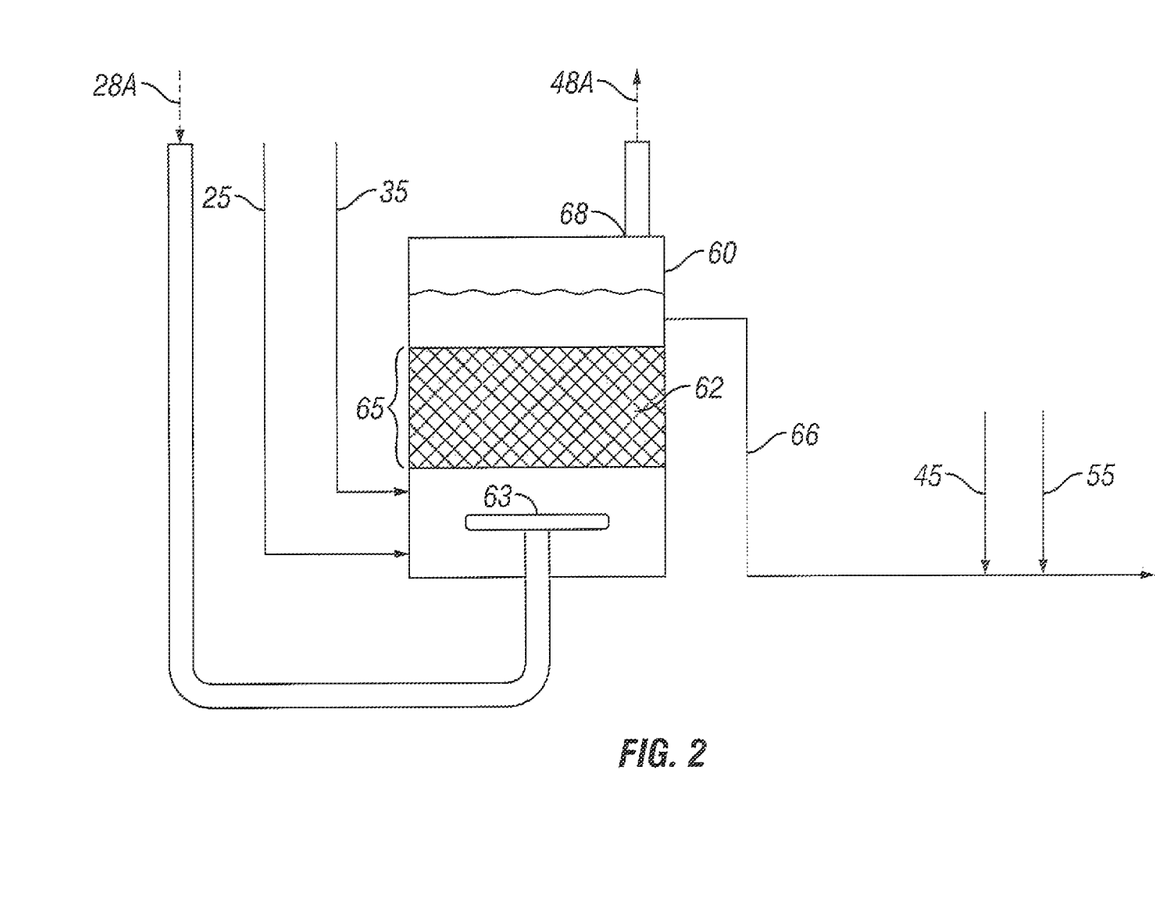
FIG. 2 is a flow diagram showing liquid sulfur being degassed of $H_2S$.

Referring now to FIG. 2, a sulfur degassing vessel 60 is arranged to receive the liquid sulfur from liquid discharge conduits 25 and 35 at a lower portion of the vessel 60 or at the bottom of the vessel 60. Inside the vessel 60 is liquid sulfur with a contained catalyst 62 held within a contact zone 65 that is generally above the lower portion of the vessel 60. A degassed liquid sulfur discharge line 66 is arrange to remove liquid sulfur above the contact zone such that liquid sulfur entering the vessel 60 must pass completely through the contact zone 65 or at least through a substantial portion of the contact zone 65. The catalyst 62 may take one of several forms. The first form is a plurality of high surface area alumina particles (spheres, extrudates, etc.) constrained to prevent being removed or carried away by sulfur flow from the vessel 60. A second form is a plurality of similarly constrained high surface area alumina particles impregnated with iron oxides. A third form is one or more low surface area alumina porous ceramic foam supports coated with high surface alumina particles with or without impregnated iron oxide.

The catalyst 62 converts $H_2S_x$ to $H_2S$ and elemental sulfur. Reducing the content of $H_2S_x$ at this stage of the production of liquid sulfur has been found to substantially reduce the tendency of stored liquid sulfur to slowly yield $H_2S$ gas. The productivity of the catalyst 62 is enhanced by agitation, especially by gas. In the present invention, as distinguished from prior known systems, the gas used to stir the liquid in the contact zone 65 is process gas from the Claus process delivered through conduit 28A of $H_2S$ containing gas. A metering valve may be arranged so that a small amount of process gas may be injected near the bottom of the vessel in a sparger 63 to agitate the liquid and the catalyst 62 to carry produced $H_2S$ back to the Claus Sulfur Recovery Plant 10. The process gas may alternatively be taken off conduit 38 as shown by dotted line conduit 28B.

Once the gas has passed through the vessel 60, it exits at exit conduit 68 and rejoins the Claus process downstream of the source of the process gas at conduit 28. In the preferred arrangement, the process gas rejoins the Claus process at conduit 48 via conduit 48A. It should be noted that the process gas may optionally be arranged to rejoin the Claus process at conduit 38 as shown by dotted line 38A. However, there is a more significant pressure drop between conduits 28 and 48 to allow for more vigorous stirring of the catalyst 62 by the process gas from sparger 63. For even more vigorous stirring, the process gas may optionally be arranged to rejoin the Claus process further along the system such as at conduit 51A. This arrangement is shown by dotted line 48B and may be preferred if the source of the process gas used in vessel 60 comes from conduit 38 via conduit 28B. While the process gas from the vessel 60 will not have been subjected to all of the successive treatments in the catalytic reactors 31, 41 and 51, it may have some vaporous elemental sulfur that could be condensed in condenser 52 and may be subjected to further sulfur removal treatment in a tail gas unit, which are conventional in Claus plants.

One additional side reaction occurring in the contact zone 65 worth mentioning is additional conversion of $H_2S$ to elemental sulfur. The process gas includes some $SO_2$ and may reaction on the surface of the catalyst with $H_2S$ that may be condensed in the liquid sulfur, emanating from the liquid sulfur by the decomposition of $H_2S_x$, or contained in the process gas. This reaction is the same chemical reaction occurring in the Claus process and is generally described as: $2H_2S+SO_2 \leftrightarrow 3/xS_x 2H_2O$. Having additional active catalyst for this chemical reaction to occur yields more liquid sulfur separated from the industrial process and less sulfur compounds in process gas.

It is noted that it has long been recognized that the catalytic process occurring in contact zone 65 is an equilibrium reaction and therefore, gases that have been used for agitating the catalyst always exclude $H_2S$. This is more expensive than simply using a side stream of process gas. And, the process gas includes enough $H_2S$ to warrant further sulfur recovery steps so that $H_2S$ recovered in the vessel 60 is simply and efficiently disposed. As compared to an arrangement using air or nitrogen, the air and nitrogen will have acquired small amounts of $H_2S$ and elemental sulfur vapor that must be handled. These gases usually must be directed to a part of the sulfur recovery unit where combustion can convert the elemental sulfur to $SO_2$ to avoid plugging the vent line from the process either contributing additional $SO_2$ emissions or requiring recycling with some motive fluid such as air or steam. This adds additional costs to operating a Claus process.

The process gas, as noted above generally includes H2S. Process gases in line 28 may contain about 4% to about 9% by volume $H_2S$ and typically about 8% by volume $H_2S$. Process gases in line 38 typically comprise less $H_2S$, but certainly have sufficient pressure to agitate the catalyst 62 and return to the Claus process 10. Process gases in line 38 may have between 2% to 5% $H_2S$ by volume and typically about 4% by volume $H_2S$. Process gases in line 48 still retain sufficient pressure to be used to agitate the catalyst 62 and has a lower $H_2S$ content being about 0.5% $H_2S$ to about 3% $H_2S$ by volume and typically about 1% $H_2S$ to about 2% $H_2S$ by volume.

Figure 3:
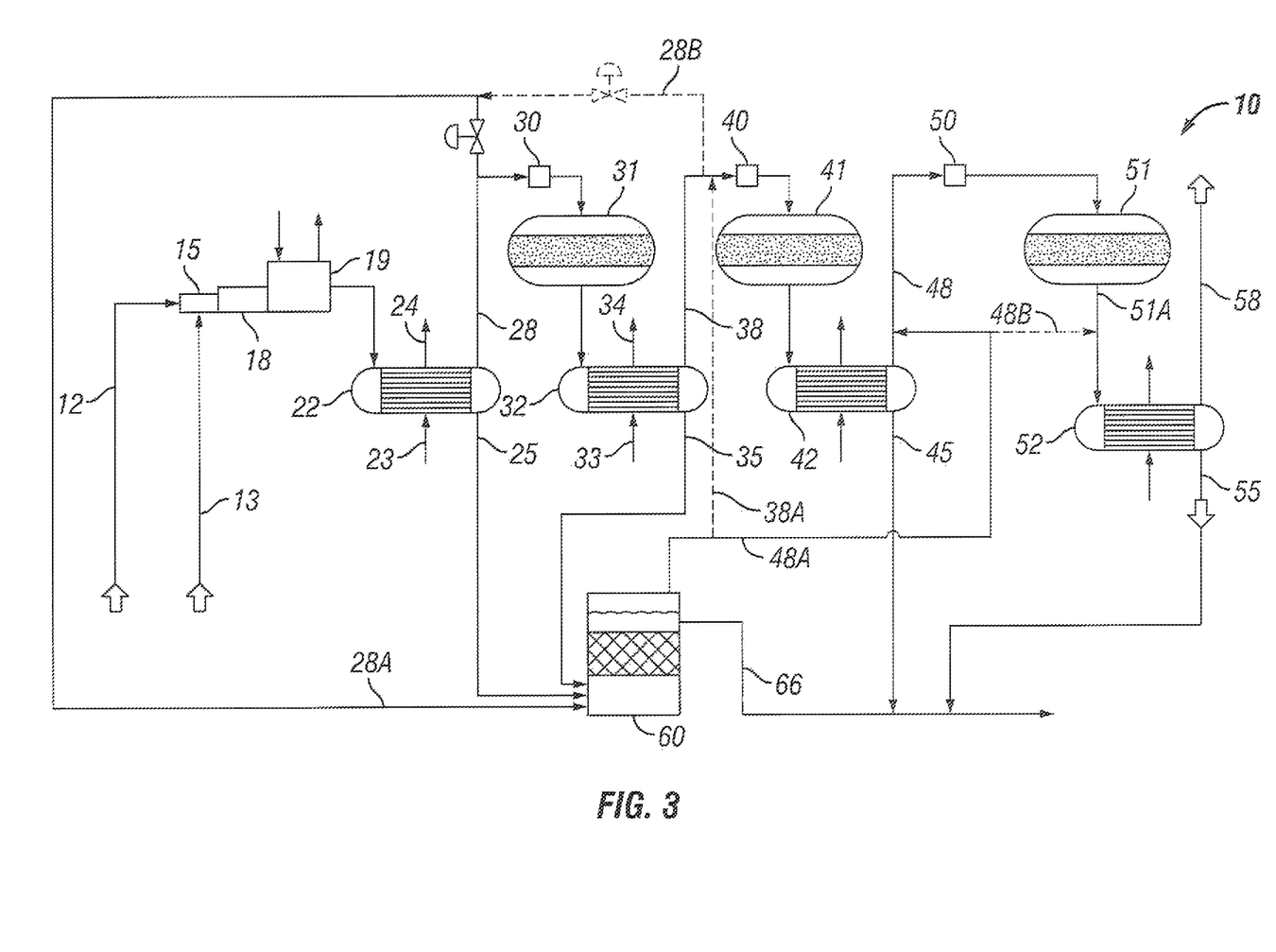
FIG. 3 is a flow diagram of the vessel connected to the Claus process.

The full Claus process with the vessel 60 is generally shown in FIG. 3 showing the side stream of process gas being taken from line 28 and being carried through the vessel 60 and back into the Claus process at line 38.

The vessel 60 may optionally be arranged to receive liquid sulfur discharged through drains 45 and 55 for degassing. In the preferred arrangement, the liquid sulfur discharge lines 45 and 55 are combined with the degassed liquid sulfur in line 66. It has been found that such small streams of liquid sulfur really do not contain much $H_2S_x$ that needs degassing. Most of the liquid sulfur is gathered from the first two condensers 22 and 32.

Figure 4:
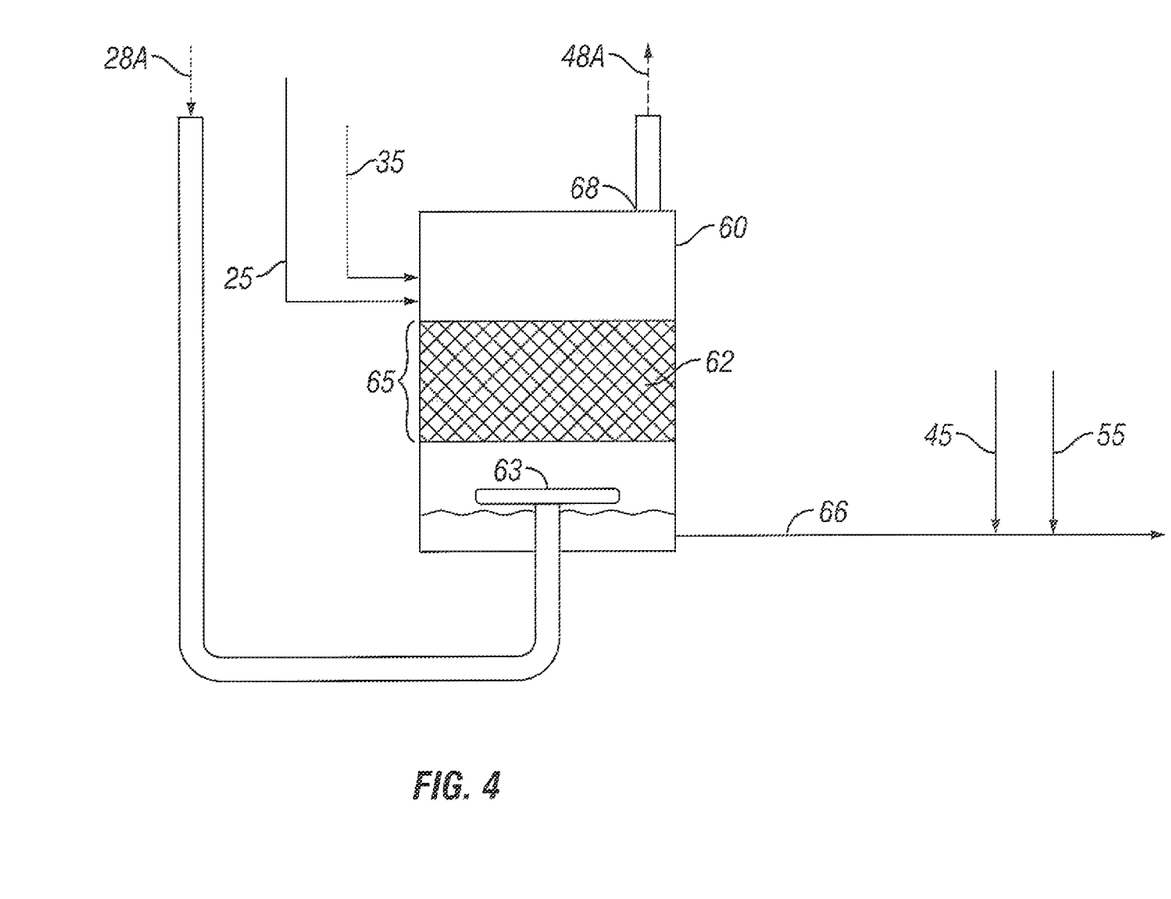
FIG. 4 is a flow diagram of an alternative embodiment showing the liquid sulfur being degassed of $H_2S$.

In an alternative embodiment shown in FIG. 4, the liquid sulfur may be received at the top of the vessel 60 and liquid elemental sulfur having the sulfanes removed may be withdrawn at the bottom of the vessel 60. In this embodiment, the sulfur is travelling counter to the flow of the process gas through the reaction zone 65. In FIG. 2, the catalyst zone 65 is shown as being liquid continuous, whereas, in the alternative embodiment shown in FIG. 4, the catalyst zone may be gas continuous with the liquid sulfur trickling down through the contact zone 65.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for producing liquid sulfur that is degassed of $H_2S$, wherein the process comprises:
    a) providing a sulfur degassing catalyst and liquid sulfur into a vessel wherein the sulfur degassing catalyst and liquid sulfur define a contact zone;
    b) directing condensed products from a Claus plant into the contact zone of the vessel wherein the condensed products include elemental sulfur, dissolved $H_2S$ and $H_2S_x$ where x≥2;
    c) catalyzing the conversion of $H_2S_x$ on the surface of the sulfur degassing catalyst to form $H_2S$ and elemental sulfur;
    d) directing a process gas from the Claus plant at an elevated pressure into the contact zone of the vessel to agitate the sulfur degassing catalyst and liquid sulfur and carry $H_2S$ that has formed on the surface of the sulfur degassing catalyst away from the sulfur degassing catalyst; wherein the process gas includes $H_2S$;
    e) exhausting the processes gases along with $H_2S$ from the contact zone back to the Claus plant for further processing in the Claus plant; and
    f) extracting liquid sulfur that is degassed of $H_2S$ from the contact zone.

2. The process according to claim 1, wherein the step of providing a sulfur degassing catalyst comprises providing a plurality of high surface area alumina particles constrained to prevent being removed or carried away from the contact zone.

3. The process according to claim 1, wherein the step of providing a sulfur degassing catalyst comprises providing one or more low surface area alumina porous ceramic foam supports coated with high surface alumina particles.

4. The process according to claim 3, wherein the step of providing a sulfur degassing catalyst further comprises providing one or more low surface area alumina porous ceramic foam supports coated with high surface alumina particles that is impregnated with iron oxide.

5. The process according to claim 1, wherein the process gas directed into the contact zone includes at least 0.5% $H_2S$ by volume.

6. The process according to claim 1, wherein the process gas directed into the contact zone includes at least 1.0% $H_2S$ by volume.

7. The process according to claim 1, wherein the process gas directed into the contact zone includes at least 2.0% $H_2S$ by volume.

8. The process according to claim 1, wherein the process gas directed into the contact zone includes at least 3.0% $H_2S$ by volume.

9. The process according to claim 1, wherein the process gas directed into the contact zone includes at least 5.0% $H_2S$ by volume up to about 9%.

10. The process according to claim 1, the Claus process includes at least three condensers, but only the liquid sulfur from the first two condensers are subject to degassing in the contact zone.

11. The process according to claim 1 further including converting $H_2S$ to elemental sulfur by reacting on the surface of the catalyst with $SO_2$ in the process gas by the following reaction: $2H_2S+SO_2 \leftrightarrow 3/xS_x+2H_2O$.

12. A process for producing liquid sulfur that is degassed of $H_2S$, wherein the process comprises:
    a) providing a sulfur degassing catalyst comprising a plurality of high surface area alumina particles impregnated with iron oxide and liquid sulfur into a vessel wherein the sulfur degassing catalyst and liquid sulfur define a contact zone;
    b) directing condensed products from a Claus plant into the contact zone of the vessel wherein the condensed products include elemental sulfur, dissolved $H_2S$ and $H_2S_x$ where x≥2;
    c) catalyzing the conversion of $H_2S_x$ on the surface of the sulfur degassing catalyst to form $H_2S$ and elemental sulfur;
    d) directing a process gas from the Claus plant at an elevated pressure into the contact zone of the vessel to agitate the sulfur degassing catalyst and liquid sulfur and carry $H_2S$ that has formed on the surface of the sulfur degassing catalyst away from the sulfur degassing catalyst wherein the process gas includes $H_2S$;
    e) exhausting the processes gases along with $H_2S$ from the contact zone for further processing in the Claus plant; and f) extracting liquid sulfur that is degassed of H$_2$S from the contact zone.

13. A process for producing liquid sulfur that is degassed of H$_2$S, wherein the process comprises:
    a) providing a Claus plant for desulfurizing H$_2$S containing gases, wherein the Claus plant includes a number of components including a burner for converting some H$_2$S to SO$_2$ along with elevated pressure process gas, a reaction furnace for converting at least some H$_2$S and SO$_2$ to elemental sulfur, a first condenser for condensing the sulfur from the process gas exiting the reaction furnace, at least one additional catalytic reactor for converting a portion of the H$_2$S in the process gas from the first condenser to elemental sulfur, a second condenser for condensing the sulfur in the gases exiting the one additional catalytic reactor;
    b) providing a sulfur degassing catalyst and liquid sulfur into a vessel wherein the sulfur degassing catalyst and liquid sulfur define a contact zone;
    b) directing condensed products from at least one condenser of the Claus plant to the vessel, wherein the condensed products include elemental sulfur, dissolved H$_2$S and H$_2$S$_x$ where x≥2;
    c) catalyzing the conversion of H$_2$S$_x$ on the surface of the sulfur degassing catalyst in the contact zone to form H$_2$S and elemental sulfur;
    d) directing process gas from the Claus plant at elevated pressure from a source within the Claus plant downstream of the first condenser into the contact zone of the vessel to agitate the sulfur degassing catalyst and liquid sulfur and carry H$_2$S that has formed on the surface of the sulfur degassing catalyst away from the sulfur degassing catalyst; wherein the process gas includes H$_2$S;
    e) exhausting the process gas along with H$_2$S from the contact zone for further processing in the Claus plant at a point upstream of the second condenser that is at a lower pressure than the elevated pressure from the source of the process as within the Claus plant; and
    f) extracting liquid sulfur that is degassed of H$_2$S from the contact zone.

14. The process according to claim 13, wherein the step of providing a sulfur degassing catalyst comprises providing a plurality of high surface area alumina particles constrained to prevent being removed or carried away from the contact zone.

15. The process according to claim 14, wherein the step of providing a sulfur degassing catalyst further comprises providing a plurality of high surface area alumina particles impregnated with iron oxide.

16. The process according to claim 13, wherein the step of providing a sulfur degassing catalyst comprises providing one or more low surface area alumina porous ceramic foam supports coated with high surface alumina particles.

17. The process according to claim 16, wherein the step of providing a sulfur degassing catalyst further comprises providing one or more low surface area alumina porous ceramic foam supports coated with high surface alumina particles that is impregnated with iron oxide.

18. The process according to claim 13, wherein the process gas directed into the contact zone includes at least 0.5% H$_2$S by volume.

19. The process according to claim 13, wherein the process gas directed into the contact zone includes at least 1.0% H$_2$S by volume.

20. The process according to claim 13, wherein the process gas directed into the contact zone includes at least 2.0% H$_2$S by volume.

21. The process according to claim 13, wherein the process gas directed into the contact zone includes at least 3.0% H$_2$S by volume.

22. The process according to claim 13, wherein the process gas directed into the contact zone includes at least 4.0% H$_2$S by volume.

23. The process according to claim 13, wherein the process gas directed into the contact zone includes at least 5.0% H$_2$S by volume.

24. The process according to claim 13, the Claus process includes at least three condensers, but only the liquid sulfur from the first two condensers are subjected to degassing in the contact zone.

25. The process according to claim 13 further including converting H$_2$S to elemental sulfur by reacting on the surface of the catalyst with SO$_2$ in the process gas by the following reaction: $2H_2S + SO_2 \leftrightarrow 3/xS_x + 2H_2O$.

26. A process for producing liquid sulfur that is degassed of H$_2$S, wherein the process comprises:
    a) providing a sulfur degassing catalyst and liquid sulfur into a vessel wherein the sulfur degassing catalyst and liquid sulfur define a contact zone and further wherein the sulfur degassing catalyst comprises a plurality of high surface area alumina particles impregnated with iron oxide;
    b) directing condensed products from a Claus plant into the contact zone of the vessel wherein the condensed products include elemental sulfur, dissolved H$_2$S and H$_2$S$_x$ where x≥2;
    c) catalyzing the conversion of H$_2$S$_x$ on the surface of the sulfur degassing catalyst to form H$_2$S and elemental sulfur;
    d) directing a process gas from the Claus plant at an elevated pressure into the contact zone of the vessel to agitate the sulfur degassing catalyst and liquid sulfur and carry H$_2$S that has formed on the surface of the sulfur degassing catalyst away from the sulfur degassing catalyst; wherein the process gas includes H$_2$S;
    e) exhausting the processes gases along with H$_2$S from the contact zone for further processing in the Claus plant; and
    f) extracting liquid sulfur that is degassed of H$_2$S from the contact zone.

27. A process for producing liquid sulfur that is degassed of H$_2$S, wherein the process comprises:
    a) providing a Claus plant for desulfurizing H$_2$S containing gases, wherein the Claus plant includes a number of components including a burner for converting some H$_2$S to SO$_2$ along with elevated pressure process gas, a reaction furnace for converting at least some H$_2$S and SO$_2$ to elemental sulfur, a first condenser for condensing the sulfur from the process gas exiting the reaction furnace, at least one additional catalytic reactor for converting a portion of the H$_2$S in the process gas from the first condenser to elemental sulfur, a second condenser for condensing the sulfur in the gases exiting the one additional catalytic reactor;
    b) providing a sulfur degassing catalyst and liquid sulfur into a vessel wherein the sulfur degassing catalyst and liquid sulfur define a contact zone and further wherein the sulfur degassing catalyst comprises a plurality of high surface area alumina particles impregnated with iron oxide;
    b) directing condensed products from at least one condenser of the Claus plant to the vessel, wherein the condensed products include elemental sulfur, dissolved H$_2$S and H$_2$S$_x$ where x≥2;

c) catalyzing the conversion of $H_2S_x$ on the surface of the sulfur degassing catalyst in the contact zone to form $H_2S$ and elemental sulfur;
d) directing process gas from the Claus plant at elevated pressure into the contact zone of the vessel to agitate the sulfur degassing catalyst and liquid sulfur and carry $H_2S$ that has formed on the surface of the sulfur degassing catalyst away from the sulfur degassing catalyst; wherein the process gas includes $H_2S$;
e) exhausting the process gas along with $H_2S$ from the contact zone for further processing in the Claus plant; and
f) extracting liquid sulfur that is degassed of $H_2S$ from the contact zone.

* * * * *